United States Patent

Cohn et al.

[11] Patent Number: 5,363,186
[45] Date of Patent: Nov. 8, 1994

[54] METHOD OF PRODUCING AN OPTICAL WAVE WITH A PREDETERMINED OPTICAL FUNCTION

[75] Inventors: Robert W. Cohn; Minhua Liang, both of Louisville, Ky.

[73] Assignee: The United States of America as represented by the Secretary of the Air Force, Washington, D.C.

[21] Appl. No.: 192,475

[22] Filed: Jan. 27, 1994

[51] Int. Cl.⁵ .................................. G01C 3/08
[52] U.S. Cl. .................................. 356/4; 356/28
[58] Field of Search ..................... 356/4, 28

[56] References Cited

U.S. PATENT DOCUMENTS

| | | | |
|---|---|---|---|
| 4,995,102 | 2/1991 | Ichinose et al. | 342/158 |
| 5,012,253 | 4/1991 | Schuster et al. | 342/203 |
| 5,142,289 | 8/1992 | Petersson | 342/158 |
| 5,184,218 | 2/1993 | Gerdes | 358/133 |
| 5,187,484 | 2/1993 | Stove | 342/200 |
| 5,252,981 | 10/1993 | Grein et al. | 342/200 |
| 5,258,996 | 11/1993 | Fraser et al. | 375/1 |
| 5,276,636 | 1/1994 | Cohn | 364/822 |

*Primary Examiner*—Mark Hellner
*Attorney, Agent, or Firm*—William G. Auton; Jacob N. Erlich

[57] ABSTRACT

A five step method is used to produce an optical wave. The first step is to pick the desired far field pattern of the diffractive optical wave. The second step entails transforming the desired far field pattern to the desired source using a fast fourier transform (FFT). In the third step we use the formula $\exp[j\phi_i(\sigma_i)] = \overline{A}_i \exp(j\overline{\phi}_i)$ to find the standard deviation $\sigma_i$ for each pixel i that produces the desired/average amplitude. Next, we use a pseudo-random number generator to select phases $\phi_i$ from distributions of standard deviation $\sigma_i$ for each pixel. Finally, we check the solution with the FFT and our analyses of performance.

9 Claims, 3 Drawing Sheets

METHOD OF PRODUCING AN OPTICAL WAVE WITH A PREDETERMINED OPTICAL FUNCTION

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to diffractive optical elements, and more specifically the invention pertains to a method to synthesize phase weights for derived diffraction patterns for optical elements in applications such as a phase-only spatial light modulator (SLM).

Any diffraction pattern can be produced in the Fourier plane by specification of a corresponding input plane transparency. Complex-valued transmittance is generally required but, in practice, phase-only transmittance is used. Many design procedures use numerically intensive, constrained optimization. What is needed instead is to introduce a non-iterative procedure that directly translates the desired, but unavailable, complex transparency into an appropriate phase transparency such that at each pixel the value of phase is pseudorandomly selected from a random distribution whose standard deviation is specified by the desired amplitude, and to derive statistical expressions and use them to evaluate the approximation errors between the desired and achieved diffraction patterns.

This invention is motivated by a desire to design phase-only filters and diffractive elements with a small amount of electronic computation and thereby permit programming of arbitrary spatial modulation at real-time rates. Popular design procedures (e.g. the Dammann grating, simulated annealing, iterative constrained optimization, and other iterative procedures) are only practical if performed off-line due both to the numerical cost of performing Fourier transforms repeatedly and the further cost of evaluating the sensitivity of the transform with respect to a large number of pixels (frequently every pixel of the input plane spatial light modulator.) Of course, the solutions can be precomputed and stored in memory, but only if the number of designs required is not too great.

There are many procedures in the area of computer generated holography, esp. kinoforms that permit direct synthesis of the input plane. These presuppose that the Fourier transform pair between the fully complex-valued input and Fourier planes are known and work by encoding the desired complex values to appropriate phase settings. The direct synthesis design procedures thus allow programming at real-time rates, if the desired Fourier plane pattern is known. The amount of memory is also minimized if the complex valued Fourier transform pair can be written as an easily computed function.

The task producing an optical wave with a predetermined function is alleviated, to some extent, by the systems disclosed in the following U.S. Patents, the disclosures of which are incorporated herein by reference:

U.S. Pat. No. 5,258,996 issued to Fraser, et al;
U.S. Pat. No. 5,187,484 issued to Stove;
U.S. Pat. No. 5,184,218 issued to Gerdes;
U.S. Pat. No. 5,142,289 issued to Peterson;
U.S. Pat. No. 5,252,981 issued to Grein, et al;
U.S. Pat. No. 5,012,253 issued to Schuster;
U.S. Pat. No. 4,995,102 issued to Ichinose, et al; and
U.S. Pat. No. 5,276,636 issued to Cohn, et al.

The patent to Ichinose et al discloses a reversed spiral scanning method used by laser radar. The remaining patents are of interest.

Most frequently the direct procedures operate on a small number of adjacent pixels together as a group that approximates several discrete settings over the complex plane (i.e., cell-oriented encoding). This however reduces the space bandwidth, which is already quite small (say $128 \times 128$ pixels) for current spatial light modulators, as compared to traditional fixed pattern holographic and diffractive optical elements. The procedure of the present invention is also a direct method, but one for which a continuous value of phase is selected for each individual pixel independent of all other settings (i.e., point-oriented encoding.)

SUMMARY OF THE INVENTION

The present invention includes a five step method to synthesize the pixel phase and amplitudes of an optical wave. The first step is to pick the desired far field pattern of the diffractive optical wave. The second step entails transforming the desired far field pattern to the desired source using a fast fourier transform (FFT). In the third step we use the formula $\exp[j\phi_i(\sigma_i)] = A_i \exp(-j\bar{\phi}_i)$ to find the standard deviation $\sigma_i$ for each pixel i that produces the desired/average amplitude. Next, we use a pseudo-random number generator to select phases $\phi_i$ from distributions of standard deviation $\sigma_i$ for each pixel. Finally, we check the solution with the FFT and our analyses of performance. As mentioned above, phase-only holograms are often designed to produce far-field diffraction patterns that approximate desired patterns. Iterative search for the optimal transform pair under the constraint of phase-only modulation is not always required. In the present invention, we instead select a desired far-field pattern which specifies the source distribution. Amplitude and phase are encoded by controlling the randomness of phase across the source.

The method is analogous to placing a variable roughness diffuser over the source. Increasing roughness at a pixel decreases its coherent contribution to the far-field pattern.

Any array of random phase pixels has an average far-field pattern that is identical to the Fourier transform of the average pixel transmittances. It follows that the average far-field pattern is approximated by setting each pixel to a value randomly selected from its individual phase ensemble.

This process described above can be used by either a radar or an optical phased array steering system, and applied to a feature based tracking system for automated production line technology.

It is an object of the present invention to produce a method to design phase-only diffractive optical elements.

It is another object of the present invention to synthesize desired phase weights for desired diffractive patterns.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes a process for designing phase-only diffractive optical elements and to synthesize phase weights for desired diffraction patterns.

The present method directly follows from mathematical models (presented below) of far-field diffraction from arrays of randomly-phased point sources. More specifically, the phases are treated as independent and non-identically distributed random variables. It is convenient for analysis and the design procedure to represent the random variables with a single probability density function that is varied in its mean and standard deviation. Our analyses shows that on average, the pixels with phases drawn from large standard deviation distributions behave as if they have a smaller amplitude transmittance. This result was noted in an average contrast loss for arrays of phase-only pixels that have identically distributed phase errors. This result is a special case of that for non-identically distributed phases.

The ideal SLM for our procedure modulates phase continuously over a full $2\pi$ range. Regularly spaced pixels are assumed in the examples below but are not required in our theory. These characteristics are typical of those anticipated for the piston-modulating (or flexure-beam) deformable mirror device and is achievable with birefringent and twisted nematic liquid crystals. For binary and multi-level optics the quantized values of phase can be modeled as statistical departures from the desired analog phase and their additional effect on the diffraction pattern can be estimated.

The design procedure of the present invention specifies the degree of randomness (i.e. standard deviation) of phase at each pixel in order to approximate arbitrary values of amplitude. This is analogous to placing a diffuser of spatially varying roughness over the input plane. Increasing roughness at a pixel decreases its coherent contribution to the far-field pattern. The remaining incoherent, or diffused light is spread over the entire diffraction pattern and contributes a noise background that is frequently referred to as speckle. The design phase at any pixel is specified as the expected value of its random phase distribution. Thus the full complex input plane can be viewed as a cascade of a deterministic phase screen with a variable roughness phase screen.

Figure 1:
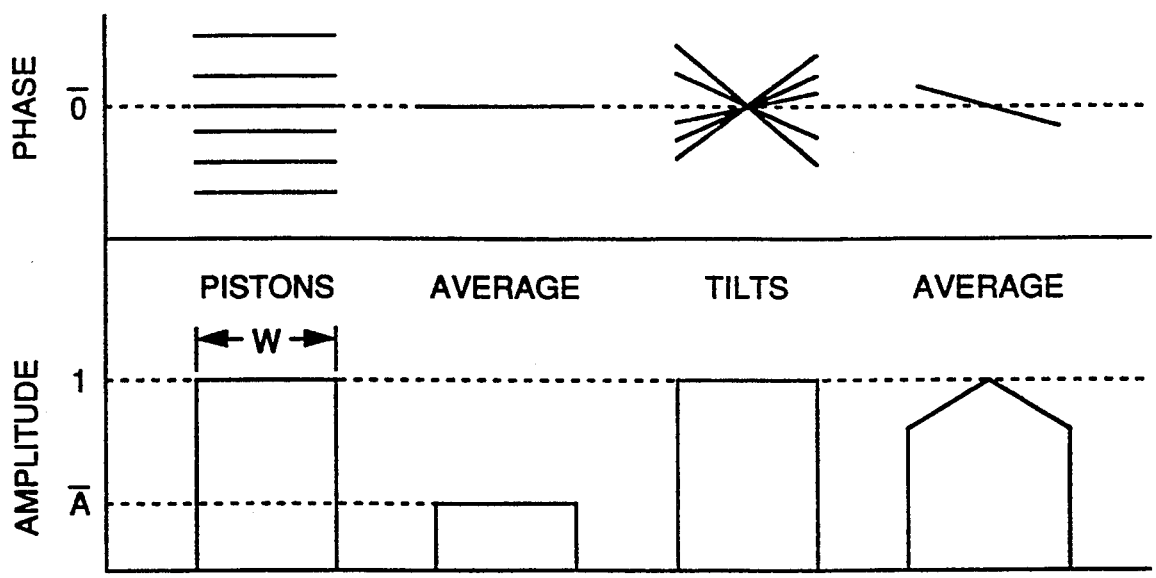
FIG. 1 is an illustration of expected pixel and SLM transmittance of the phase and amplitudes of random phase-only pixels.

This interpretation follows from the statistical expectation of a complex exponential of a random argument which is schematically illustrated in FIG. 1 and derived in the following section. FIG. 1 shows the spatial phase and amplitude for two types of phase-only pixels:

1. piston-only, those that produce a single value of phase across the pixel width; and
2. tilt-only, those that produce a linearly-varying value of phase across the pixel width.

The design procedure is concerned with the former structure, and the latter is provided as a further example of the concept. The leftmost of the four plots of amplitude and phase represents a random phase pixel. Because phase is a random variable we show an ensemble of phase values. The ensemble average of the random complex exponential produces the result in the second column—an average value of phase and a loss in amplitude transmittance. The example of pixels with random tilts shows a similar result in that the average amplitude transmittance decreases with increasing phase fluctuations that directly correspond with distance from the pivot point.

Because both expectation and Fourier transform are linear operations then the expected complex amplitude of the far-field pattern of the piston-only pixel, as well as an array of pixels, is the Fourier transform of the expected transmittance. The expected intensity of the far-field pattern consists of the magnitude squared of the complex amplitude plus a broad pedestal due to the average intensity of speckle.

In our design procedure, rather than average many trials, we instead select a single value of phase from the ensemble for each pixel. The expected complex amplitude and intensity of the far-field pattern for this situation is mathematically equivalent to that described in the previous paragraph. More important, the actual far-field pattern approximately resembles the average pattern that results from the coherent summation of a large number of random wavefronts. Thus, the formation of the far-field pattern can be viewed as a physical example of the central limit theorem, i.e. the so called "law of large numbers".

The following definitions for arrays of piston-only pixels are used in the development of the statistical expressions. The complex transmittance of an individual pixel located at position $X_i$ will be written as $a_i(X)$ and the transmittance of the array of the N individual pixels is $$t(x) = \sum_{i=1}^{N} a_i(x) = \sum_i r(x - x_i) \exp(j\psi_i) \quad (1)$$

where $\Psi$ is the phase shift produced by the i'th pixel of the SLM. The abbreviation $r(X)=\text{rect}(x/w)$ has been used where w is the width of each pixel. Any inactive area between the pixels has been treated as non-reflecting and the amplitude and phase of each pixel have been defined in local coordinates centered around $x=O$ and then shifted to pixel locations $x_i$. The intensity of the far-field diffraction pattern is written $$I(f_x) = T(f_x)T^*(f_x) = \mathcal{F}\{t(x) \oplus t(x)\} \quad (2)$$

where $T(f_x)$ is the Fourier transform of the transmittance $t(x)$ and where $\oplus$ indicates the correlation integral $$a(x) \oplus b(x) = \int a(x'+x) b^*(x') dx' \quad (3)$$

The squared intensity spectrum expressed in terms of the fourth-order autocorrelation of SLM transmittance is $$I^2 = TT^*T = \mathcal{F}\{[t(x) \oplus t(x)] \oplus [t(x) \oplus t(x)]\} \quad (4)$$

Unlike convolution, the order in which correlations are performed affects the result, and thus the brackets are required in eq. 4.

The expected value of a complex phasor of a random argument is frequently referred to as the characteristic function of the random variable $\Psi$ $$M'(\omega) = \langle \exp(j\omega\psi) \rangle = \int_{-\infty}^{\infty} \exp(j\omega\psi) p_\psi(\psi) d\psi = 2\pi \mathcal{F}^{-1}\{p_\psi(\psi)\} \quad (5)$$

where $\langle\,\rangle$ is our symbol for the ensemble average (i.e. expectation) operator and $\mathcal{F}$ is the Fourier transform operator, and $p\Psi$ is the probability density function of the random variable $\Psi$. If the phase $\Psi_i$ are independent random variables then the expected value of pixel transmittance $a_i(x)$ is $$\begin{aligned}
\overline{a_i}(x) &= \langle a_i(x) \rangle = \langle r(x-x_i) \exp(j\psi_i) \rangle \\
&= r(x-x_i) M_i'(1) \\
&= r(x-x_i) \exp(j\psi_i) M_i(1)
\end{aligned} \quad (6)$$

where $M'_i$ is the characteristic function of $\Psi_i$ and $M_i$ is the characteristic function of the unbiased values of phase $\Psi_i - \langle\Psi_i\rangle$. The last line of eq. 6 has been written to identify the magnitude and phase components and corresponds with the second average piston case in FIG. 1.

We considered two specific probability distributions for phase $\Psi_i$. For gaussian distributed phase of standard deviation $\sigma_i$ $$M_i(1) = \exp\left(-\frac{1}{2}\sigma_i^2\right) \quad (7)$$

and for uniformly distributed phase with total spread $$v_i = \sqrt{12}\, \sigma_i \quad (8)$$

then $$M_i(1) = \operatorname{sinc}\left[\frac{v_i}{2\pi}\right] \quad (9)$$

For either distribution the average amplitude transmittance at each pixel i can be controlled explicitly by selection of the value of the standard deviation $\sigma_i$. In digital simulations we prefer the uniform distribution since most gaussian random number generators are derived by performing additional numerical operations on uniform samples. A further advantage of using uniform statistics is that the total spread never need exceed $2\pi$, whereas with gaussian statistics the standard deviation can be infinite, and which can lead to overflow and underflow errors if not handled carefully.

The expected value of eq. 1, using either probability distribution, is the expected SLM transmittance $$\overline{t}(x) = \sum_{i=1}^{N} \langle a_i(x) \rangle = \sum_i r(x-x_i) p_i^{\frac{1}{2}} \exp(j\psi_i) \quad (10)$$

where the parameter $$P_i = M_i^2(1) \quad (11)$$

is used to simplify subsequent expressions. Note that because the expectation and Fourier transform operators are both linear the expected far-field transmittance (more precisely, the angular spectrum) is $$\overline{T}(f_x) = \mathcal{F}\{\overline{t}(x)\} \quad (12)$$

The nomenclature in eq. 12 of using lower-case letters for space domain variables and upper-case variables for frequency domain variables will be used throughout this discussion.

The most general expectation for the intensity of the far-field diffraction pattern SLMs with statistically independent pixels follows from the first equality in eq. 1 and eq. 2. It is $$\begin{aligned}
\overline{I}(f_x) &= \sum_i \sum_j \langle A_i(f_x) A_j^*(f_x) \rangle \\
&= \sum_i \sum_j \langle A_i \rangle \langle A_j^* \rangle + \sum_i \langle |A_i|^2 \rangle \\
&= \sum_i \sum_j \langle A_i \rangle \langle A_j^* \rangle - \sum_i |\langle A_i \rangle|^2 + \sum_i \langle |A_i|^2 \rangle \\
&= |\overline{T}|^2 + \sum_i [\langle |A_i|^2 \rangle - |\overline{A_i}|^2]
\end{aligned} \quad (13)$$

where the intermediate results indicate how independence was used to simplify the expression. This expression shows that the expectation nearly separates into $|\langle T \rangle|^2$ except for terms involving the autocorrelation of the input plane pixels (i.e. terms for which $i=j$.) Under the same assumption of independent pixels the most general expression for the squared far-field intensity is $$\begin{aligned}
\langle I^2 \rangle &= \sum_i \sum_j \sum_k \sum_l \langle A_i A_j^* A_k^* A_l \rangle \\
&= 2[\overline{I}^2 - |\overline{T}|^4] + |\overline{T}^2 + \sum_i (\langle A_i^2 \rangle - \overline{A_i}^2)|^2 + \\
&\quad 4\operatorname{Re}\left[\overline{T}^* \sum_i (\langle |A_i|^2 A_i \rangle - \langle A_i^2 \rangle \overline{A_i}^* + 2|\overline{A_i}|^2 \overline{A_i} - 2\langle |A_i|^2 \rangle \overline{A_i})\right] +
\end{aligned} \quad (14)$$

-continued $$\sum_i [<|A_i|^4> - 6|\overline{A_i}|^4 + 8 <|A_i|^2>|\overline{A_i}|^2 - |<A_i^2>|^2 - 2 <|A_i|^2>^2 + 4Re(<A_i^2>\overline{A_i}^{*2} - <|A_i|^2 A_i>\overline{A_i}^*)]$$

It was found by substituting eq. 1 into eq. 4 and then taking the expectation of eq. 4. The second equality was found by a procedure similar to that shown in eq. 13. The standard deviation of intensity $\sigma_I(f_x)$ is then directly found using the well known result $$\sigma_I^2 = <I^2> - \overline{I}^2 \tag{15}$$

for the specific case of piston-only, non-identically distributed random phase eqs. 13–15 simplify to $$I(f_x) = \mathcal{F}\left(\overline{t}(x)\oplus\overline{t}(x) + [r(x)\oplus r(x)]\sum_i q_i\right) \tag{16}$$

$$= |\overline{T}(f_x)|^2 + R^2(f_x)\sum_i q_i$$

where
$$q_i = 1 - p_i \tag{17}$$

and $$\sigma^2(f_x) = \overline{I}^2 - 2|\overline{T}|^4 + |\overline{T}^2 - T_A|^2 - 4Re[\overline{T}T_B^*] - \sigma_A \tag{18}$$

We introduce a shorthand for defining repeated autocorrelations of the rect function $r(x)$ $$g_n(x) = [r(x) \oplus \cdots \oplus r(x)]_n \tag{19}$$

where n indicates the number of rect functions (i.e. $n-1$ integrals). Eq. 18 is completely specified with the additional definitions for the gaussian distribution $$t_A(x) = \sum_i g_2(x - 2x_i) \exp(j2\psi_i) q_i p_i \tag{20}$$

$$t_B(x) = \sum_i g_3(x - x_i) \exp(j\psi_i) q_i^2 p_i^{\frac{1}{2}}$$

$$g_A(x) = g_4(x)\sum_i q_i^4$$

and for the uniform distribution $$t_A(x) = \sum_i g_2(x - 2x_i) \exp(j2\psi_i)(p_i - d_i) \tag{21}$$

$$t_B(x) = \sum_i g_3(x - x_i) \exp(j\psi_i)(q_i - p_i + d_i)p_i^{\frac{1}{2}}$$

$$g_A(x) = g_4(x)\sum_i (q_i - 3p_i + 6p_i^2 - 4p_i d_i + d_i^2)$$

where
$$d_i = \mathrm{sinc}\left[\frac{v_i}{\pi}\right] \tag{22}$$

The expected intensity pattern (eq. 16) contains the desired design intensity pattern (the magnitude square of eq. 12) plus an additional term [proportional to $\sigma_2(f_x) = R^2(f_x)$] that we associate with the average level of speckle intensity (and which is often referred to as "halo" or "pedestal".) This second term is proportional to the far-field diffraction pattern intensity of a single pixel. Examination of eq. 18 also reveals that each of its terms has the common factor $G4(f_x) = G_2^2(f_x)$. Thus for a standard definition of single-to-noise ratio $$SNR(f_x) = \frac{\overline{I}(f_x)}{\sigma_I(f_x)} \tag{23}$$

the term $G_2(f_x)$ cancels out and is independent of spatial frequency. The reciprocal of eq. 23 basically describes the relative approximation error (especially when $\sigma_I$ is small compared to I and the contribution of pedestal can be partially ignored.)

Another type of signal-to-noise ratio, that is quite common in describing the quality of an optical correlation peak, is the ratio of peak intensity to background noise level, and is often referred to as peak-to-noise ratio (PNR). The analysis above permits calculation of this as well, however, unless the pixels are point sources the pixel elements factor $G2(f_x)$ needs to be considered and so there will be different values of signal-to-noise-ratio depending on the pixel fill factor. The steps of the design procedure of the present invention are:

1) Specify the desired far-field pattern T(f).
2) Fourier transform to the desired source distribution t(x) such that for each pixel i: invert eq. 9 (preferred, or eq. 7) to find $\sigma_i$.
3) Select a pseudorandom number, appropriately scaled by $\sigma_i$ to represent the random phase $\phi_i$. Fourier transform the array of random phase-only pixels to evaluate the actual far-field pattern. If desired, compare the actual far-field $I(f_x)$ with eqs. 16, 18 and 23.

Several designs have been simulated and analyzed, two of which are presented in some detail. In every case the design is for a 128×128 pixel phase-only SLM. It is represented as a 128×128 array of samples embedded in the center of a 512×512 array of zeroes. A fast Fourier transform (FFT) routine is used to approximate the Fourier transform of the array and of the individual terms comprising the expectations in eqs. 16 and 18.

The uniform random number generator DRNUNF (from the IMSL numerical software library) with initialization subroutine RNOPT(6) was used. We mention this because initially there were problems using the random number generator RAN1 Specifically, when we attempted to verify eqs. 16 and 18 by Monte Carlo estimation (that is ensemble averaging of a large number of identical designs generated with different random number seeds) the estimates sometimes converged to different results than the equations. The discrepancies were especially obvious at harmonically related sets of spatial frequencies. This may indicate that RAN1 produced correlated sequences in these experiments. These problems however were not discernable in individual design runs because of the magnitude of the random fluctuations.

When using DRNUNF we did find that plots of Monte Carlo estimates of the expected value and standard deviation of intensity, except for small fluctuations, appear to closely match our expressions when 1000 design runs are used in the estimate. We also checked that the relative error between the theory and estimate decreases with increasing number of design runs and that this improvement is roughly proportional to the square root of the number of design runs used in the estimate, as would be expected. Our closest result, using $10^5$ design runs, converged to the theoretical expressions with fluctuation of less than 0.4% standard deviation.

Figure 2A:
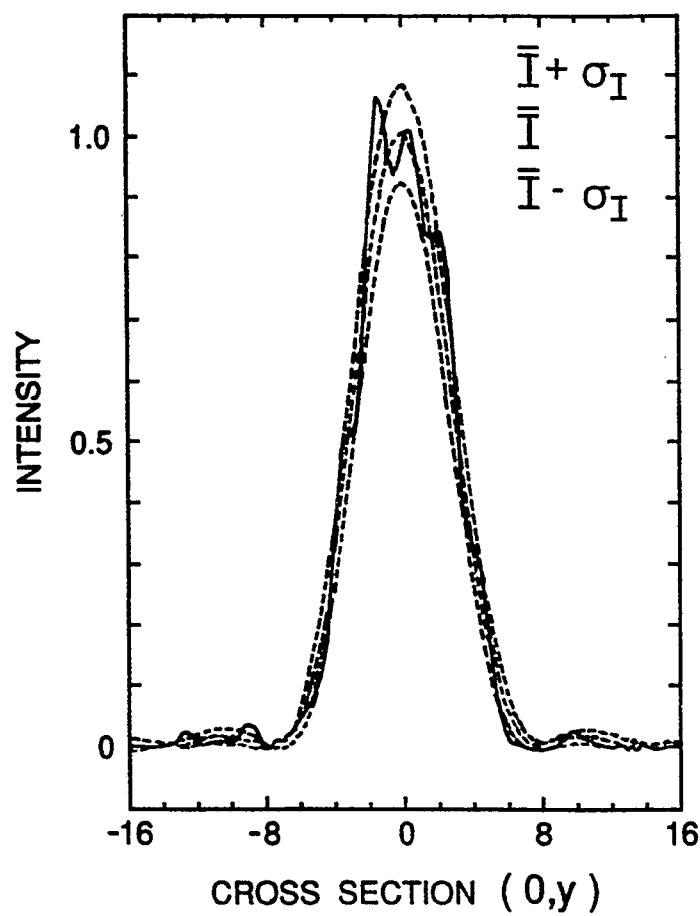
FIG. 2a is a chart of the diffraction pattern of a phase-only elliptical aperture; (cross section along long axis)
Figure 2B:
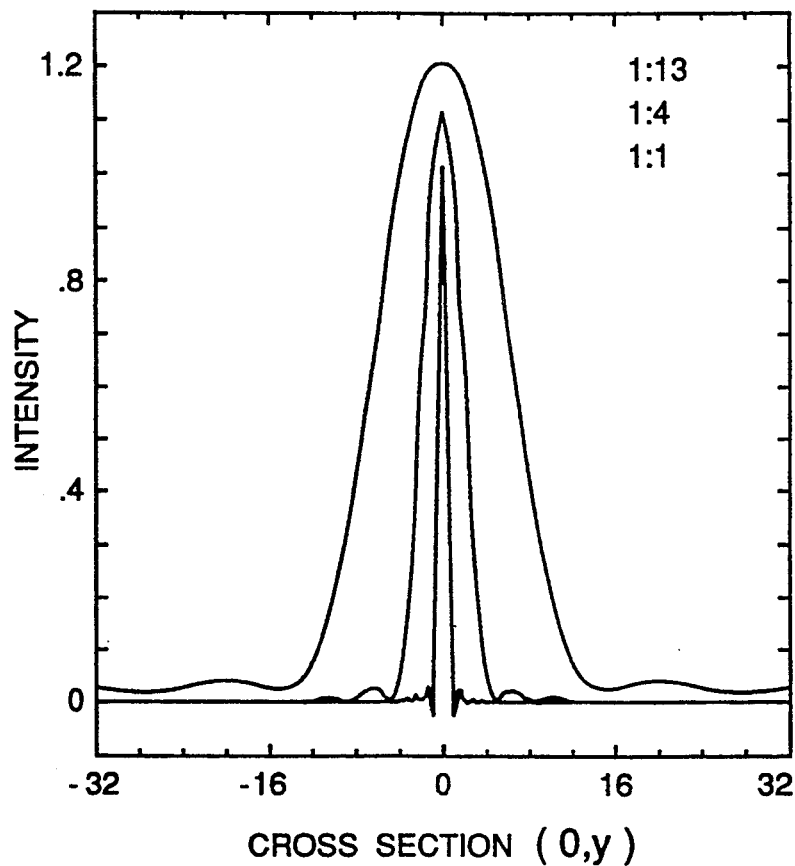
FIG. 2b is a chart of the performance of a 128 by 128 SLM for various ellipticities.

A phase modulation was developed to approximate an elliptically shaped aperture of eccentricity 6:1. FIG. 2a presents the diffraction pattern along the vertical axis. FIG. 2b is a chart of the expected intensity profiles. The 1+01 ratio is nearly equivalent to the diffraction pattern along the horizontal axis for all values of eccentricity. FIGS. 2a and 2b together are examples of beam shaping by this method. FIG. 2a presents quantitative information along the vertical axis. The light curves depict the error bars of $\pm_I$ added to the expected intensity. These provide a rough idea of the magnitude of the actual fluctuations, both of the coherent peak and the speckle dominated sidelobe region.

Figure 3:
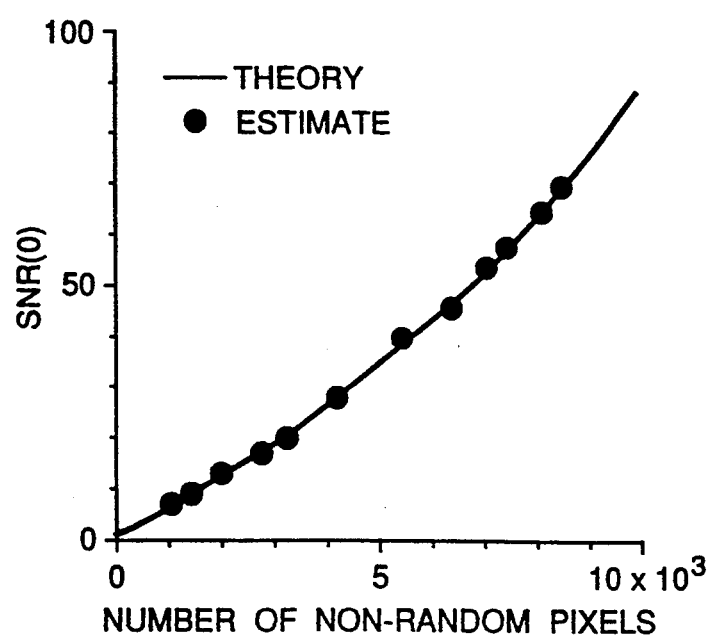
FIG. 3 is a chart of the signal to noise ratio at diffraction peak as a function of the number of non-random pixels for pseudorandom encoding of binary amplitudes.

It should be apparent that fluctuations, and thus approximation errors will be smaller for those binary amplitude designs that use a greater number of non-random pixels. This relationship can be seen in eq. 23 which simplifies to $$SNR(0) = \frac{N_N^2 + N_R}{\sqrt{2 N_R N_N^2 - N_R + N_R^2}} \approx \frac{N_N}{\sqrt{2 N_R}} \quad (24)$$

the zero frequency where the diffraction intensity peaks. $N_R$ is the number of randomly modulated pixels on the SLM and $N_N$ is the number of non-randomly modulated pixels and their sum is the total number of SLM pixels, 16,384. The approximation in eq. 23 is valid except for SNR close to unity; for instance, for 1000 non-random pixels the relative error is roughly 1% and the SNR is 5.7. FIG. 3 plots eq. 24 against 500 run Monte Carlo estimates of SNR(0). These estimates correspond to elliptical aperture designs with a major axis of 128 pixels and eccentricity ranging from 1 to 13 and circular apertures of diameter from 42 to 128 pixels. For reference, there are 2016 non-random pixels in the ellipse of eccentricity 6:1. This data point on FIG. 3 is nearly indistinguishable from the point for a circular aperture of diameter 50 pixels and which contains 1976 pixels.

A second performance measure describing the quality of the far-field diffraction pattern is the peak intensity to noise ratio which we choose to define here as $$PNR \equiv \frac{\bar{I}(0)}{\sigma_I(f_x)} \approx \frac{N_N^2}{N_R} \approx 2 \, SNR^2(0) \approx \frac{\bar{I}(0)}{\bar{I}(f_x)} \quad (25)$$

where $f_x$ is assumed to be a frequency in the sidelobe region. The approximations follow by assuming the expected transmittance is negligible (i.e. $<T(f_x)> = 0$ in eqs. 16 and 18) with respect to the speckle intensity in the sidelobe region. Additionally, we set the ratio of $G_2(0)/G_2(f_x)$ to unity, mainly to more dramatically indicate the simple relationship between PNR and SNR(0). In our simulations, for which we choose $f_x$ as the Nyquist frequency [i.e. the point half way between the (0,0) and the (1,1) diffraction order], the first approximation indicates that the average level of speckle in the sidelobe regions is equal to the standard deviation of intensity. This result is not unexpected based on previous observations that the intensity of fully developed speckle patterns is exponentially distributed and that the standard deviation of this distribution is equal to its mean.

We have also evaluated the design procedure for the approximation of an apodized input plane. Two dimensional gaussian, airy pattern and sinc functions with varying aspect ratioes have been synthesized. The sinc and airy functions were chosen to produce brickwall and top-hat diffraction patterns. However, the finite spatial extent of the SLM severely truncates the ideal functions and produces significant in-band ripple (Gibbs phenomena) and large sidelobes. The only feature to recommend this design is the extremely rapid transition band.

The transition bandwidth can be readily traded off with ripple and sidelobe level by the window design method that is widely used in the design of finite impulse response digital filters. In this method truncation effects are controlled by multiplying the ideal, infinite extent functions by an amplitude tapered window in place of a rect function. One of the best windows for designing uniform intensity patterns is the Dolph-Chebyshev function. It is considered optimal in the sense that its Fourier transform produces the minimum mainlobe width for a given sidelobe level. The parameter $\alpha$ specifies the sidelobe level of $20\alpha$ in dB.

We have used the window method to design a pseudorandom phase modulation that will diffract into a close approximation to a brickwall shape. The design function is a one dimensional sinc function multiplied by a Dolph window in both coordinates. Our general design goal for this example is to produce a diffraction with the largest aspect ratio (or eccentricity) possible that still reasonably resembles a brickwall shape. We feel that for a 128×128 SLM this goal is met by the function sinc(4x) multiplied by Dolphs in x and y that both have $\alpha$ equal to 1.3.

Figure 4A:
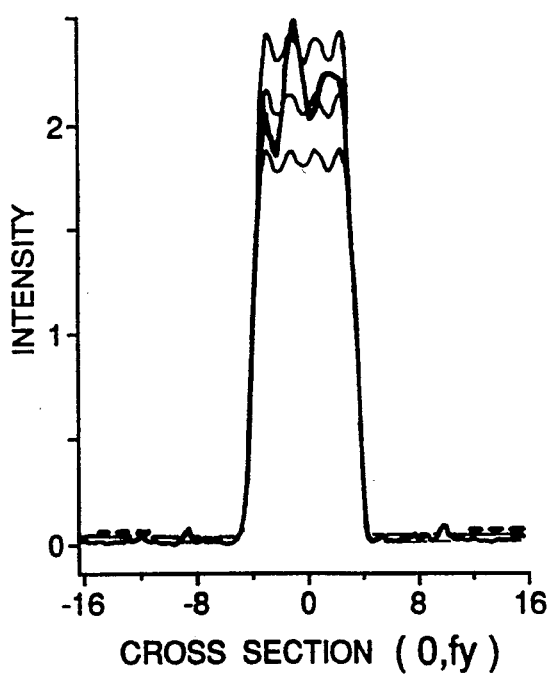
FIG. 4 is a set of two charts (a) and (b) of the diffraction pattern of a phase-only approximated Dolph-windowed since anodization where (a) cross section is across vertical axis $(O,f_y)$ and the dashed horizontal lines indicate the saturation (full-white) level.
Figure 4B:
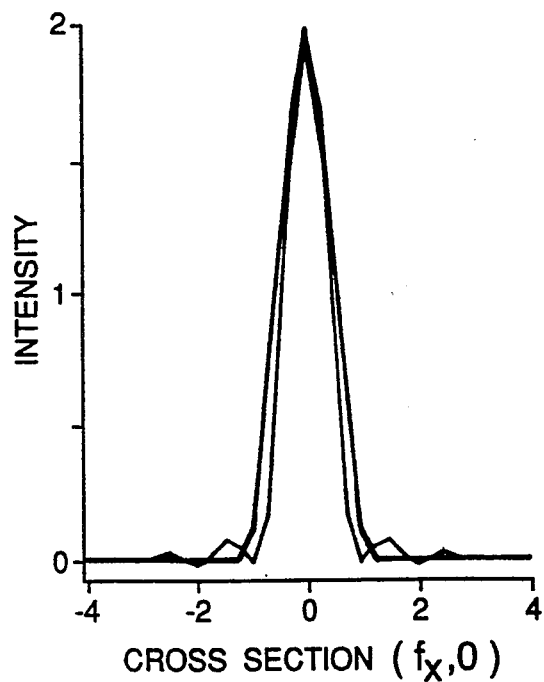

This result is presented in FIG. 4.

FIG. 4a makes clear that increasing further also increases the intensity of speckle and overall passband ripple is not reduced because the random fluctuation is already larger than the ripple for the Dolph function. The aspect ratio of this diffraction pattern is 6.7:1 at the half power as measured from the plots in FIG. 4. FIG. 4 also shows that Dolph windowing in the vertical direction has widened the diffraction pattern by about 25% at the half power points.

In order to compare the performance of various design functions with the phase-only encoding procedure we introduce the definition of effective number of random pixels $$\hat{N}_R = \sum_i^N q_i \quad (26)$$

Figure 5:
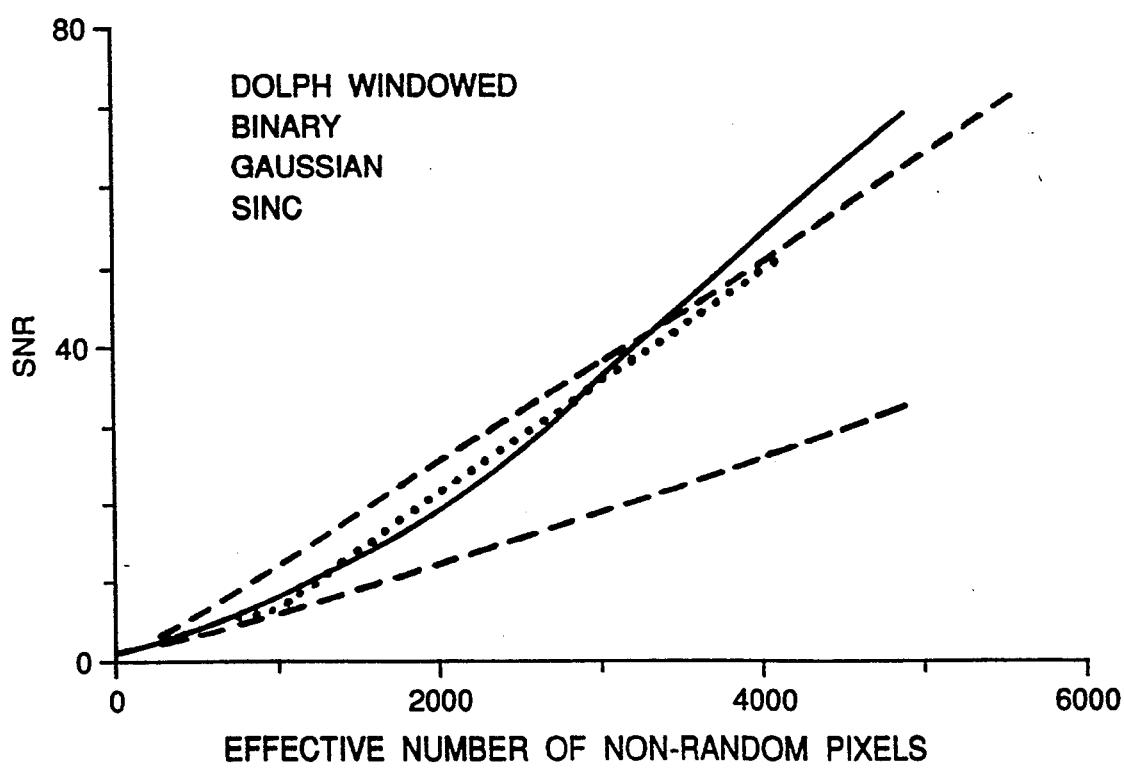
FIG. 5 is a chart of the SNR as a function of effective number of non-random pixels for pseudorandom encoding of continuous amplitudes, were the SNR(O) is plotted for gaussian and binary, and average SNR across passband is plotted for Dolph and sinc designs, and the sinc is a rectangularly symmetric function and the gaussian is a circularly symmetric function.

Eq. 27 is identically the amplitude of the noise pedestal term in eq. 16 and it is identical to $N_R$ for the case of binary modulation. FIG. 5 compares SNR for the various functions studied. The curves demonstrate a rough correspondence, with the apodized functions being more closely clustered than the binary amplitude functions. Also not shown is the circularly symmetric sapproximation to an airy pattern on the input. This curve very nearly overlays the sinc curve. For reference, the SNR of the design in FIG. 4 has SNR of roughlt 8 which corresponds to an effective number of 1000 non-random pixels.

The present invention is a method, based on properties of random phase having spatially varying statistics, that approximates fully-complex input plane modulation. Diffraction patterns from pseudorandom phase-only modulation can be as energy efficient as any passive, fully complex modulation; with performance loss arising from the addition of a nearly-uniform level speckle background. Designers can use the method to specify diffractive optical elements directly from Fourier transform relationships between the input plane and far-field. The performance of any design can be readily evaluated and the quality of the far-field patterns can be anticipated from the effective number of non-random pixels in the input plane.

The method is especially useful in that phase and amplitude are specified independently of each other. Although the examples in the last section demonstrate approximation of amplitude-only inputs, the mathematical analysis shows that any value of phase (specified as the average value of phase) is permissible. For example, the far-field pattern can be translated by adding a phase slope to the design values of phase values. Therefore, a single phase-only SLM can be used to perform simultaneous and independent beam shaping and beam steering. Two dimensional scanners can be envisioned that have much more flexibility than previously. Scanning is not limited to rastered formats and multiple spots can be formed. For such applications, it should generally not be necessary to use a new set of random numbers each frame. Instead of generating them on-the-fly, a single frame of random numbers can be stored in a video memory. A simple class of functions can also be selected for beam shaping that use a small number of function calculations and memory.

It may be possible to apply this flexibility in scanning to pattern recognition, tracking and sensing. Currently raster scanning of lasers is used to sense outlines of objects. An edge point is identified by a sudden change in reflectance while scanning. A phase-only SLM based scanner can locate edges and then adapt the beam shape to enhance the return from the edge. Spots could be contoured and positioned to fit over multiple edges and corners and this could be used as "feature based" method of tracking or recognition.

The pseudorandom design procedure may have various applications to the design of free space optical interconnects. Certainly designs can be directly synthesized, and their performance can be readily evaluated; however, their optimality is not guaranteed. We feel that the approach may nonetheless reduce the computation time of other design procedures by providing a better initial guess for the iterative design procedures; especially simulated annealing approaches that start with a pseudo-random array of weights anyway.

In optical correlators, pseudo-random phase modulation can represent (typically) real-valued images in the input plane and complex filters in the filter plane with an accuracy that is reasonably modeled. We have proposed a compact phase-only correlator that uses a single phase-only SLM to perform both input and filter plane modulation. The pseudorandom encoding is an alternative to the nonlinearly transforming real-valued image data to phase. In the filter plane pseudorandom modulation may be used to approximate the full-complex matched filter without employing a full-complex SLM. Even though the performance will be reduced from that from full complex filters, it may provide useful experimental information for researchers in advance of practical full-complex devices.

Pseudorandom phase-only design may well prove useful in many optical processing applications because it is a direct non-iterative procedure, and straightforward mathematical expressions are available for determining performance bounds of the procedure.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A method of producing an optical wave having a predetermined optical function and wherein said method comprises the following steps:
   selecting a desired far-field pattern for said optical wave containing pixel phases and pixel amplitudes that represent said predetermined optical function;
   performing a fast Fourier transform on said desired far-field pattern to yield, a desired source distribution description for said optical wave;
   determining a standard deviation $\sigma_i$ for each pixel i that produces the predetermined optical function to yield thereby the pixel amplitudes Ai; and
   generating the pixel phases $\phi_i$ from random distributions of the standard deviation $\sigma_i$ for each pixel i.

2. A method as defined in claim 1, wherein said determining step comprises using a formula given by $$\overline{\exp[j\phi_i(\sigma_i)]} = \overline{A}_i \exp(j\overline{\Phi}_i)$$

to find the standard deviation $\sigma_i$ for each pixel i that produces a desired average amplitude.

3. A method as described in claim 1, wherein said generating step comprises using a pseudo-random number generator to select phases $\phi_i$ from distributions of standard deviation $\sigma_i$ for each pixel.

4. A method as described in claim 2, wherein said generating step comprises using a pseudo-random number generator to select phases $\phi_i$ from distributions of standard deviation $\sigma_i$ for each pixel.

5. A method as described in claim 2, wherein said generating step comprises using a pseudo-random number generator to select phases $\phi_i$ from distributions of standard deviation $\sigma_i$ for each pixel.

6. A method as defined in claim 1, in which after using the selecting, performing, determining and generating steps to produce said optical wave with an actual configuration, further including the steps of:
   comparing the actual configuration of the optical wave produced by the method with the predetermined optical function to evaluate the method.

7. A method as defined in claim 2, in which after using the selecting, performing, determining and generating steps to produce said optical wave with an actual configuration, further including the steps of:
   comparing the actual configuration of the optical wave produced by the method with the predetermined optical function to evaluate the method.

8. A method as defined in claim 3, in which after using the selecting, performing, determining and generating steps to produce said optical wave with an actual configuration, further including the steps of:
   comparing the actual configuration of the optical wave produced by the method with the predetermined optical function to evaluate the method.

9. A method as defined in claim 4, in which after using the selecting, performing, determining and generating steps to produce said optical wave with an actual configuration, further including the steps of:
   comparing the actual configuration of the optical wave produced by the method with the predetermined optical function to evaluate the method.

* * * * *